(12) United States Patent
Chamoun et al.

(10) Patent No.: US 12,044,580 B2
(45) Date of Patent: Jul. 23, 2024

(54) METHOD AND SYSTEM FOR MEASURING THE TEMPERATURE OF A THERMOCHROMIC LIQUID CRYSTAL

(71) Applicant: Palo Alto Research Center Incorporated, Palo Alto, CA (US)

(72) Inventors: Jacob Chamoun, Stanford, CA (US); Michael I. Recht, San Carlos, CA (US); Joerg Martini, San Francisco, CA (US); Anne Plochowietz, Mountain View, CA (US)

(73) Assignee: Xerox Corporation, Norwalk, CT (US)

( * ) Notice: Subject to any disclaimer, the term of this patent is extended or adjusted under 35 U.S.C. 154(b) by 435 days.

(21) Appl. No.: 17/402,067

(22) Filed: Aug. 13, 2021

(65) Prior Publication Data

US 2023/0046089 A1 Feb. 16, 2023

(51) Int. Cl.
*G01K 11/12* (2021.01)
*G01K 11/165* (2021.01)

(52) U.S. Cl.
CPC ............ *G01K 11/12* (2013.01); *G01K 11/165* (2013.01)

(58) Field of Classification Search
CPC .............................. G01K 11/12; G01K 11/165
See application file for complete search history.

(56) References Cited

U.S. PATENT DOCUMENTS

| | | | | |
|---|---|---|---|---|
| 5,972,715 A * | 10/1999 | Celentano | ........ | G01N 33/54373 374/161 |
| 6,319,469 B1 * | 11/2001 | Mian | .................. | B01L 3/50273 422/63 |
| 8,464,594 B2 * | 6/2013 | Narendrnath | ........... | G01F 1/663 73/861 |
| 9,963,732 B2 * | 5/2018 | Martini | ................... | C12Q 1/025 |
| 10,124,333 B2 * | 11/2018 | Bhargava | .......... | B01L 3/502715 |
| 10,724,067 B2 * | 7/2020 | Martini | ................. | B01L 3/5085 |
| 11,067,456 B2 * | 7/2021 | Diehn | ................. | G01K 11/165 |
| 11,543,303 B2 * | 1/2023 | Kiesel | .................. | G01K 17/006 |
| 2006/0077311 A1 * | 4/2006 | Renneberg | ........... | G01K 15/005 374/E11.018 |
| 2007/0132898 A1 * | 6/2007 | Anderson | ............ | G01K 11/165 374/161 |
| 2009/0318306 A1 * | 12/2009 | Hasson | .............. | G01N 25/4893 506/12 |

(Continued)

OTHER PUBLICATIONS

J.A. Stasiek and T.A. Kowalewski, "Thermochromic liquid crystals applied for heat transfer research", Opto-Electronics Review 10(1), 1-10 (2002)

(Continued)

*Primary Examiner* — Nathaniel T Woodward
*Assistant Examiner* — Philip L Cotey
(74) *Attorney, Agent, or Firm* — Ortiz & Lopez, PLLC; Kermit D. Lopez; Luis M. Ortiz

(57) ABSTRACT

Methods and systems for measuring the temperature of a sample can include the use of one or more illumination sources and a sample containing thermochromic material. One or more detectors are operable to detect two or more signals indicative of a component of an illumination facilitated by the illumination source(s) and scattered at two or more angles with respect to the sample containing the thermochromic material, wherein the signals are converted to a temperature.

20 Claims, 11 Drawing Sheets

(56) References Cited

U.S. PATENT DOCUMENTS

| | | | | |
|---|---|---|---|---|
| 2010/0159610 A1* | 6/2010 | Sun | ........................ | G01N 21/78 |
| | | | | 436/147 |
| 2016/0003749 A1* | 1/2016 | Sun | .................... | G01N 21/4788 |
| | | | | 422/82.05 |
| 2016/0325285 A1* | 11/2016 | Hasson | ................ | C12Q 1/6825 |
| 2017/0224257 A1* | 8/2017 | Rogers | ................ | A61B 5/0537 |
| 2018/0245993 A1* | 8/2018 | Shadpour | ............... | G01K 13/00 |
| 2020/0191663 A1* | 6/2020 | Kiesel | .................... | G01K 11/12 |
| 2021/0299879 A1* | 9/2021 | Pinter | .................... | B25J 9/1697 |
| 2023/0040397 A1* | 2/2023 | McCarthy | ............... | G01J 5/046 |
| 2023/0266291 A1* | 8/2023 | Myrick | ................. | H10K 30/00 |

OTHER PUBLICATIONS

Ian Sage (2011): Thermochromic liquid crystals, Liquid Crystals, 38:11-12, 1551-1561.

"Handbook of Thermochromic Liquid Crystal Technology", LCR Hallcrest, 2014.

"Forward Scatter vs. Side Scatter", FlowJo, LLC, Dec. 17, 2020.

\* cited by examiner

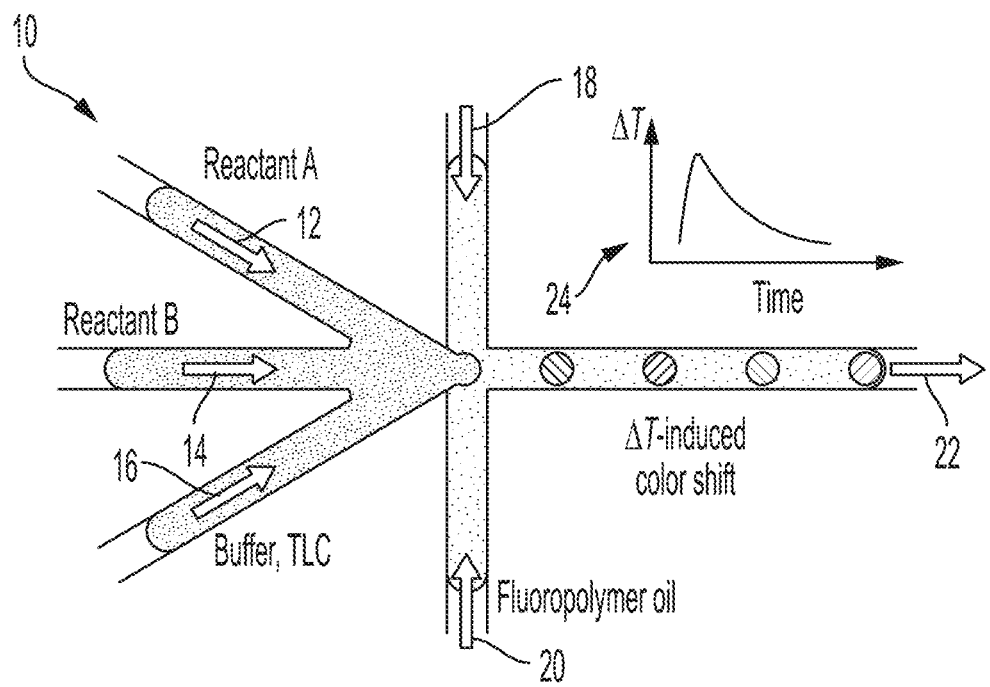
FIG. 1
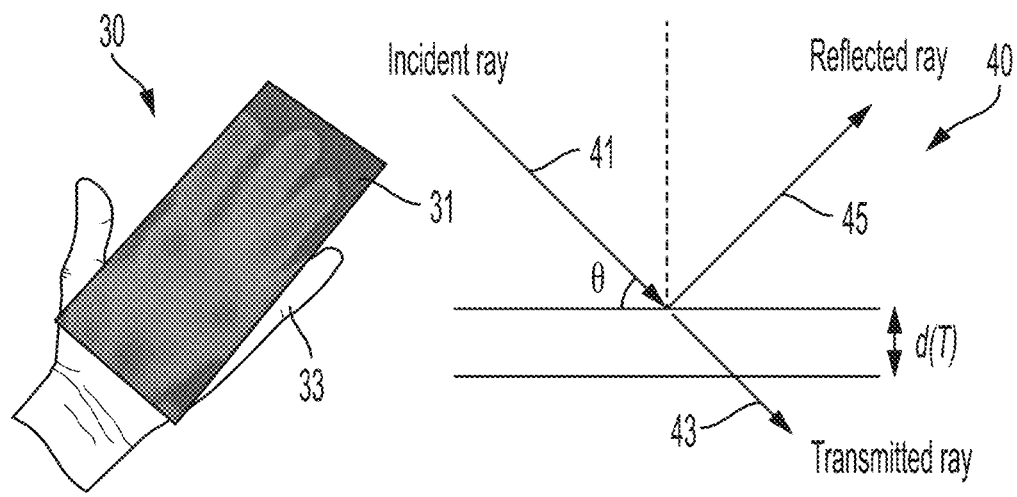
FIG. 2A
FIG. 2B

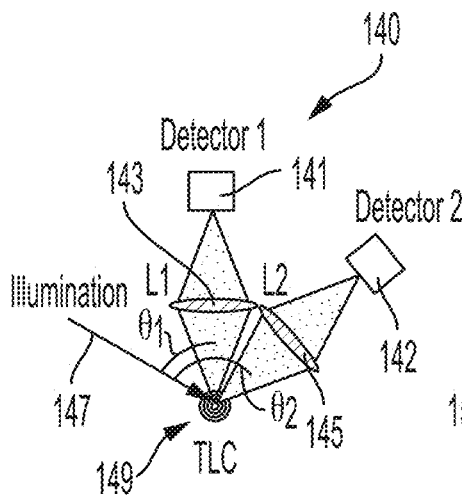
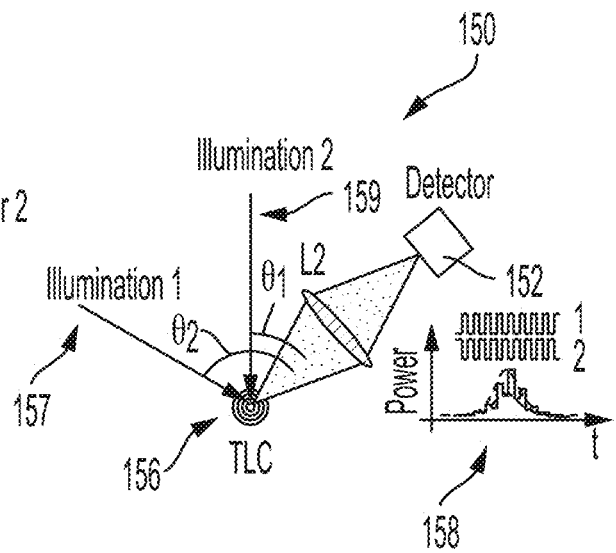
FIG. 7A
FIG. 7B
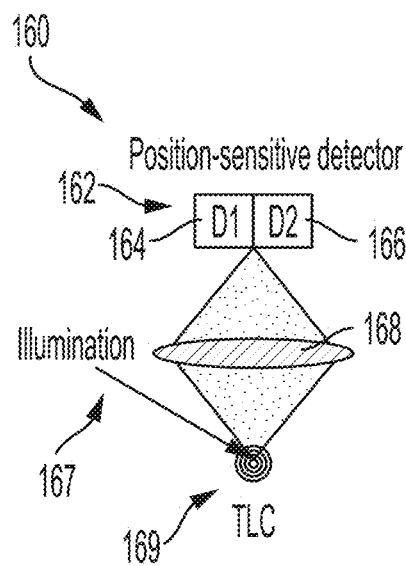
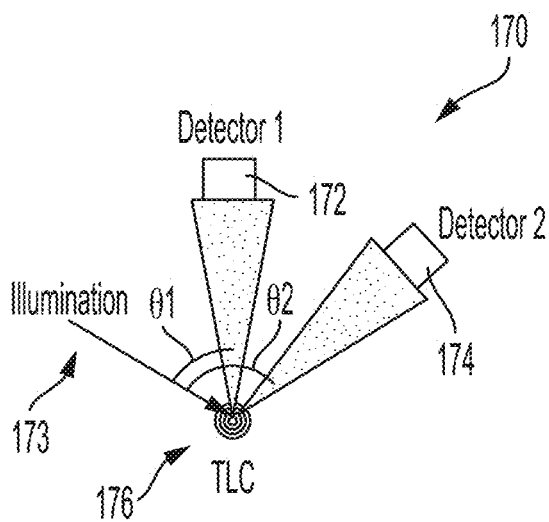
FIG. 7C
FIG. 7D

METHOD AND SYSTEM FOR MEASURING THE TEMPERATURE OF A THERMOCHROMIC LIQUID CRYSTAL

STATEMENT REGARDING FEDERALLY FUNDED SPONSORED RESEARCH AND DEVELOPMENT

This invention was made with Government support under Contract No. 1R01GM132324-01A1 awarded by the National Institutes of Health. The United States Government has certain rights in this invention.

TECHNICAL FIELD

Embodiments relate to methods and systems for measuring the temperature of a sample. Embodiments also relate to methods and systems for measuring the temperature of a transparent sample using thermochromic liquid crystal reporter particles, which can be suspended or embedded in the sample.

BACKGROUND

The temperature of a sample may be determined using thermochromic liquid crystal (TLC) particles, which can be suspended or embedded in the sample or otherwise in thermal contact with the sample. FIG. 1 illustrates a schematic diagram of a spectro-optical calorimetry (SPOC) microfluidic system 10. As shown in the example SPOC configuration of FIG. 1, a reactant A as indicated by arrow 12, a reactant B as represented by arrow 14, and a buffer solution as indicated by arrow 16, which contains TLC particles may come into contact with a fluoropolymer oil, as indicated by arrow 18 and arrow 20. TLC particles may change color in response to a change in temperature as indicted by the arrow 22 (e.g., ΔT-induced color shift over a time T as represented by graph 24. This color change approach is one of several optical methods that may be used to detect the temperature change of a TLC. The approach depicted in FIG. 1 involves microfluidic applications such as used in high throughput analysis of molecular binding kinetics for drug discovery. Other approaches implement well plate applications, such as found in the context of antimicrobial susceptibility testing.

Conventional TLC-based temperature detection applications such as shown in FIG. 1 only address the case of using the TLC reflectance spectrum to determine temperature, and do not use scattering angle of monochromatic light scattered from TLCs to read out their temperature.

BRIEF SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

It is, therefore, one aspect of the disclosed embodiments to provide for methods and systems for measuring the temperature of a sample.

It is another aspect of the disclosed embodiments to provide methods and systems for measuring the temperature of a transparent sample using TLC reporter particles, which may be suspended or embedded in the sample or otherwise in thermal contact with the sample.

It is a further aspect of the disclosed embodiments for the use of a scattering angle of monochromatic light scattered from thermochromic liquid crystals to read out their temperature.

It is another aspect of the disclosed embodiments to provide for methods and systems for measuring the temperature of a thermochromic liquid crystal and the sample the TLC particles are suspended, embedded, or in contact with.

The aforementioned aspects and other objectives and advantages can now be achieved as described herein. In an embodiment, a system for measuring the temperature of a sample, can include at least one illumination source, a sample containing thermochromic material, and at least one detector operable to detect at least two signals indicative of a component of an illumination facilitated by the at least one illumination source and scattered at at least two angles with respect to the sample containing the thermochromic material, wherein the signals are converted to a temperature.

In an embodiment, the at least one illumination source can be substantially monochromatic.

In an embodiment, the thermochromic material can be in thermal contact with the sample, and the temperature of the thermochromic material can substantially represent the temperature of the sample.

In an embodiment, the at least one illumination source can comprise one or more of: a laser, a light-emitting diode, a super luminescent light-emitting diode, or a broadband light source in combination with an optical filter.

In an embodiment, the at least one detector can contain one or more of a lens or a waveguide that collects scattered light.

In an embodiment, a data analysis pipeline can be used, which can calculate a temperature from the at least two signals.

In an embodiment, the data analysis pipeline can use a normalized difference of the at least two signals as part of the calculation of the temperature from the at least two signals.

In an embodiment, the data analysis pipeline can use a function $f$ that maps: temp|→hue (normalized difference)= $f$(temp).

In an embodiment, the at least one detector can comprise one or more of: a PIN photodiode, an avalanche photodiode, a silicon photomultiplier (SiPM), or a photomultiplier tube (PMT).

In an embodiment, the sample can comprise a microfluidic droplet or a single-phase fluid.

In an embodiment, the sample can include a fluid contained in a microwell, fluid contained in a 3D container/basin, or a fluid contained in a microfluidic channel.

In an embodiment, a method for measuring the temperature of a sample, can involve: illuminating with at least one illumination source, a sample containing thermochromic material, detecting with at least one detector, at least two signals indicative of a component of an illumination facilitated by the at least one illumination source and scattered at at least two angles with respect to the sample containing the thermochromic material, and converting the signals to a temperature.

In an embodiment, a computer-program product for measuring the temperature of a sample, can be implemented, which can include a non-transitory tangible computer-readable medium having computer-readable instructions thereon, the computer-readable instructions being executable by a processor to cause the processor to perform: illuminating with at least one illumination source, a sample containing thermochromic material, detecting with at least one detector, at least two signals indicative of a component of an illumination facilitated by the at least one illumination source and scattered at at least two angles with respect to the sample containing the thermochromic material, and converting the at least two signals to a temperature.

BRIEF DESCRIPTION OF THE DRAWINGS

The accompanying figures, in which like reference numerals refer to identical or functionally similar elements throughout the separate views and which are incorporated in and form a part of the specification, further illustrate the present invention and, together with the detailed description of the invention, explain the principles of the embodiments.

FIG. 1 illustrates a schematic diagram of a prior art spectro-optical calorimetry (SPOC) system;

FIG. 2A illustrates a pictorial drawing depicting structural color in a sheet of TLC, in accordance with an embodiment;

FIG. 2B illustrates a schematic diagram depicting Bragg reflection by a planar Bragg grating, in accordance with an embodiment;

FIG. 7A illustrates a system for measuring the temperature of a sample, in accordance with an embodiment;

FIG. 7B illustrates a system for measuring the temperature of a sample, in accordance with another embodiment;

FIG. 7C illustrates a system for measuring the temperature of a sample, in accordance with an alternative embodiment;

FIG. 7D illustrates a system for measuring the temperature of a sample, in accordance with yet another embodiment;

DETAILED DESCRIPTION

Figure 3:
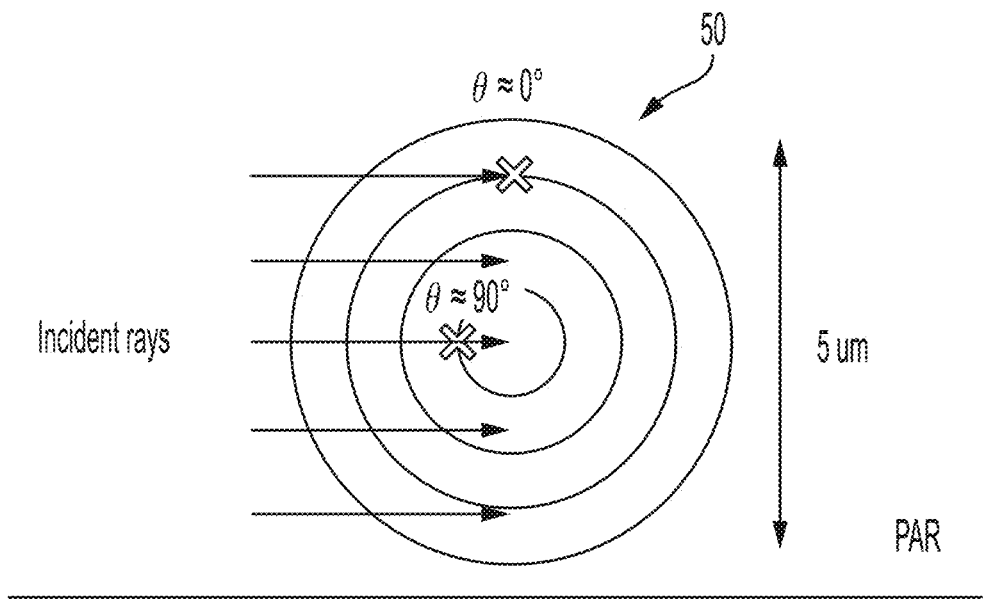
FIG. 3 illustrates a schematic diagram of TLC particles as a spherical Bragg grating, in accordance with an embodiment.

The values and configurations discussed in these non-limiting examples can be varied and are cited merely to illustrate one or more embodiments and are not intended to limit the scope thereof. Exemplary embodiments are intended to cover all alternatives, modifications, and equivalents as may be included within the spirit and scope of the composition, apparatus and systems as described herein.

A more complete understanding of the processes, systems and apparatuses disclosed herein can be obtained by reference to the accompanying drawings. These figures are merely schematic representations based on convenience and the ease of demonstrating the existing art and/or the present development, and are, therefore, not intended to indicate relative size and dimensions of the assemblies or components thereof. In the drawing, like reference numerals may be used throughout to designate similar or identical elements.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware, or any combination thereof (other than software per se). The following detailed description is, therefore, not intended to be interpreted in a limiting sense.

Throughout the specification and claims, terms may have nuanced meanings suggested or implied in context beyond an explicitly stated meaning. Likewise, phrases such as "in one embodiment" or "in an embodiment" or "in an example embodiment" and variations thereof as utilized herein do not necessarily refer to the same embodiment and the phrase "in another embodiment" or "in an alternative embodiment" and variations thereof as utilized herein may or may not necessarily refer to a different embodiment. It is intended, for example, that claimed subject matter may include combinations of embodiments in whole or in part.

In general, terminology may be understood, at least in part, from usage in context. For example, terms such as "and," "or," or "and/or" as used herein may include a variety of meanings that may depend, at least in part, upon the context in which such terms are used. Typically, "or" if used to associate a list, such as A, B, or C, is intended to mean A, B, and C, here used in the inclusive sense, as well as A, B, or C, here used in the exclusive sense. In addition, the term "at least one" and "one or more" as used herein, depending at least in part upon context, may be used to describe any feature, structure, or characteristic in a singular sense or may be used to describe combinations of features, structures, or characteristics in a plural sense. The term "at least one" may also relate to or refer to "one or more." For example, the term "at least one detector" may refer to one detector or may refer to one or more detectors.

Similarly, terms such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

Although specific terms are used in the following description for the sake of clarity, these terms are intended to refer only to the structure of the embodiments selected for illustration in the drawings and are not intended to define or limit the scope of the disclosure. In the drawings and the following description below, it is to be understood that like numeric designations refer to components of like function.

The modifier "about" used in connection with a quantity may be inclusive of the stated value and can have a meaning dictated by the context (for example, it may include at least the degree of error associated with the measurement of the quantity). When used with a specific value, it should also be considered as disclosing that value. For example, the term "about 2" also discloses the value "2" and the range "from about 2 to about 4" also discloses the range "from 2 to 4."

Although embodiments are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. For example, "a plurality of detectors" may include two or more detectors. The terms "first," "second," and the like, herein do not necessarily denote any order, quantity, or importance, but can be used to distinguish one element from another. The terms "a" and "an" herein may not denote a limitation of quantity but can denote the presence of at least one of the referenced items.

The embodiments relate to the use of scattering angle or polarization of monochromatic light scattered from thermochromic material (e.g., TLCs) to read out their temperature. This approach is different from conventional approaches in that it uses an angular scattering profile or polarization of scattered light to determine the temperature of, for example, a TLC particle instead of color. Previous approaches only address the case of using the TLC color to determine temperature. This invention is different from previous approaches in that the SPOC does not use body fluids and is not concerned with determining the concentration of an analyte. Furthermore, the disclosed approach is concerned with reflected light and not transmitted light. The advantage of using reflected light is that the TLC signal does not suffer from the hysteresis observed in the cooling of TLCs when measuring transmitted light.

Some previous approaches have used TLCs for temperature and flow studies. The disclosed embodiments are different from these conventional approaches in that the disclosed embodiments use the angular dependence of the scattering to detect the temperature (this dependence is usually viewed as a systematic error). Flow cytometers, for example, may have a forward and side scatter detector channel, which can collect scattered light at two different angles, though these may be used to measure cell size and shape and not to measure temperature of TLCs FIG. 2A illustrates a pictorial drawing 30 depicting structural color in a sheet 31 of thermochromic material (e.g., such as TLC), in accordance with an embodiment. In FIG. 2A, the sheet 31 of thermochromic material is shown placed on a hand 33. Note that the drawings illustrated herein are presented in black and white. It can be appreciated, however, that the black and white drawings are representative in some instances of color.

FIG. 2B illustrates a schematic diagram 40 depicting Bragg reflection by a planar Bragg grating, in accordance with an embodiment. FIG. 2B depicts an incident ray 41, a transmitted ray 43, and a reflected ray 45. TLC color (FIG. 21) is due to reflection from a periodic stack of reflecting layers, which may be modeled as a Bragg grating (FIG. 2B). In a Bragg grating, a strong reflection can be observed at a wavelength $\lambda_{Bragg}$ given by the Bragg condition:

$$\lambda_{Bragg} = 2d \sin \theta \quad (1)$$

(1)

where $\theta$ is the angle between the incident ray and the surface tangent as shown in FIG. 2B. For TLCs the pitch d(T) can be a function of temperature. Thus, for a given observation angle, $\lambda_{Bragg}$ changes in response to a temperature change, resulting in a color change (FIG. 2A). The range of wavelengths $\Delta\lambda$ that can be reflected to a range of angles $\Delta\theta$ can depend on the details of the Bragg grating such as how large the reflectivity of each layer is and how many layers there are. For TLCs even when the Bragg condition is satisfied the overall reflectivity may be low, so most light is transmitted. Therefore, the backing material for a TLC sheet such as the sheet 31 shown in FIG. 2A is dark and absorbing; otherwise the scattered transmitted light would overwhelm the Bragg reflection.

FIG. 3 illustrates a schematic diagram of thermochromic material (e.g., TLC particles) as a spherical Bragg grating 50, in accordance with an embodiment. The molecular layers in a TLC particle can form a spherical Bragg grating. This can cause a qualitative difference relative to the planar case: for a spherical Bragg grating a plane wave sees every incidence angle $\theta$ (e.g., $\theta \approx 0°$, $\theta \approx 90°$), so the Bragg condition is always satisfied for some combination of wavelength and angle so long as $0 < \lambda < 2d$.

Figure 4:
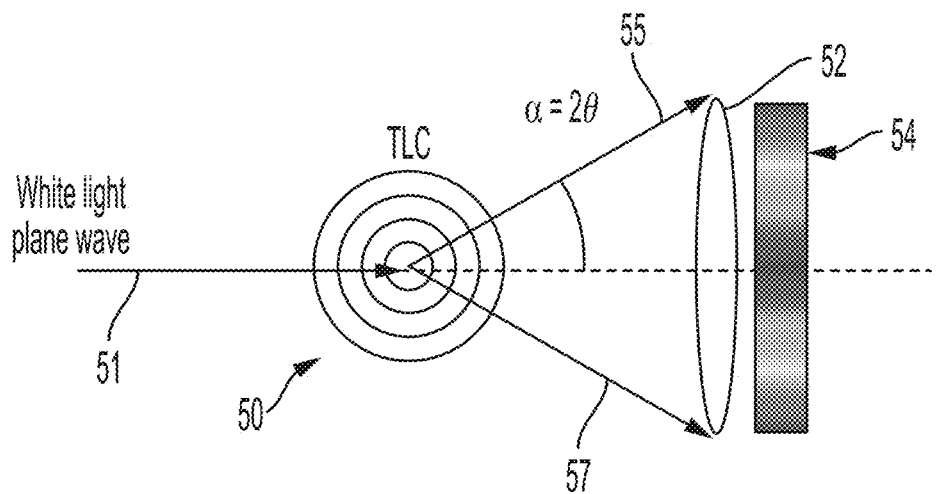
FIG. 4 illustrates a schematic diagram of dispersion by a TLC particle, in accordance with an embodiment.

FIG. 4 illustrates a schematic diagram of dispersion by a TLC particle, in accordance with an embodiment. A view of scattering of white light (i.e., see the white light plane wave indicated by arrow 51 in FIG. 4) by a TLC particle is that short wavelengths can be scattered to small scattering angles $\alpha = 2\theta$, and longer wavelengths are scattered to larger angles in a cylindrically symmetrical pattern, as shown in FIG. 4. The far field scattering pattern for a given wavelength component may be represented by a narrow circle 52 forming a conical shell with respect to arrow 55 and arrow 57. Color dispersion is indicated in FIG. 4 by a color bar 54. Note that for monochrome illumination, the scattering is into the conical shell with a width $\Delta\lambda$ that can depend on the details of the TLC structure. The cone-opening angle is initially 0° and increases with increasing temperature to 90° and all the way to 180° (backscattering).

With this background in mind, we can understand the embodiments, which involve the use of a monochromatic source to illuminate in combination with the detection at two or more angles to measure the temperature of a TLC.

Figure 5:
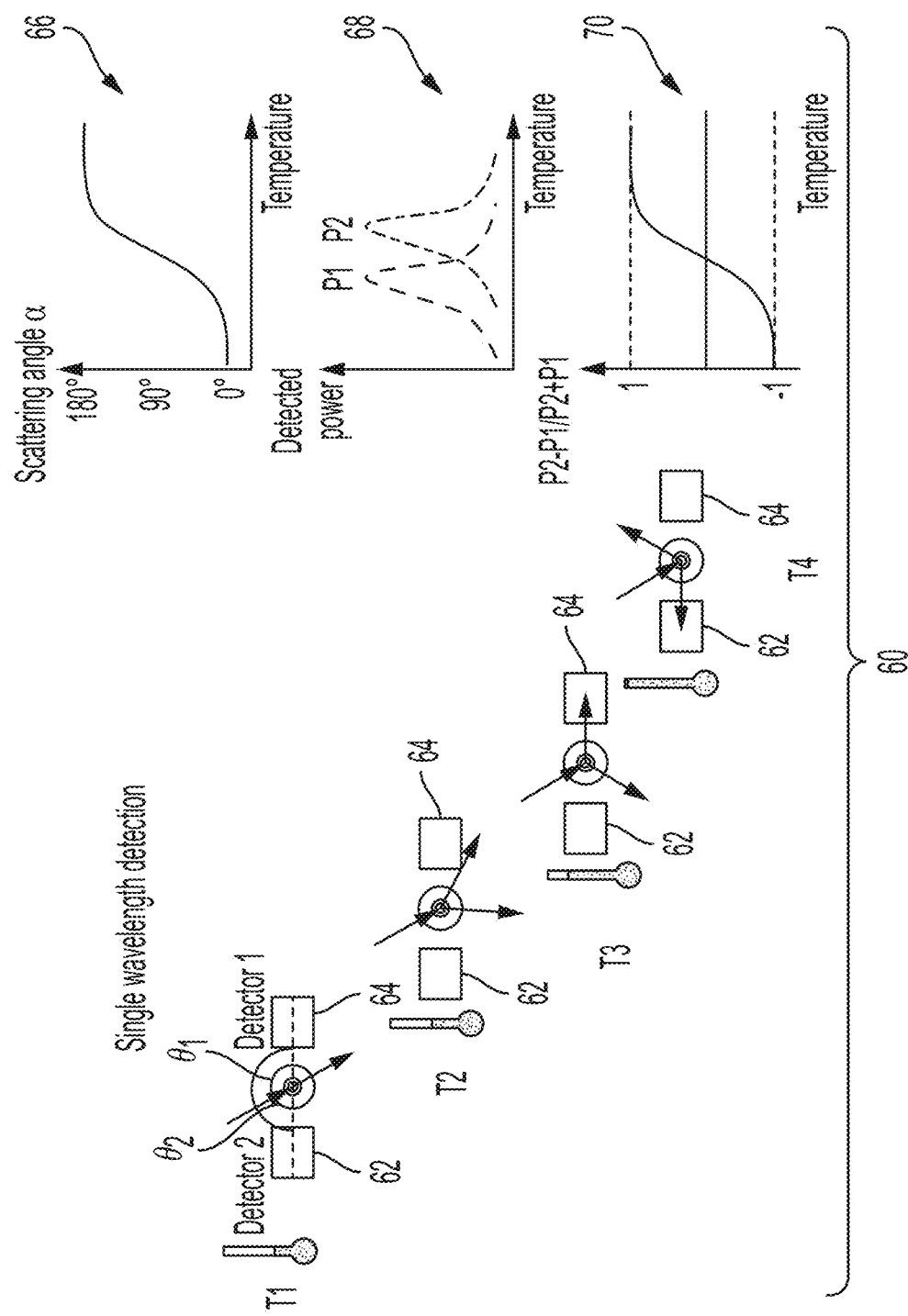
FIG. 5 illustrates a schematic diagram depicting detecting temperature shifts in a TLC particle using a single wavelength and two detection angles, in accordance with an embodiment.

FIG. 5 illustrates a schematic diagram 60 depicting detecting temperature shifts in a TLC particle using a single wavelength and two detection angles, in accordance with an embodiment. The single wavelength detection arrangement shown in FIG. 5 depicts a first detector 64 and a second detector 62 in operation at instances T1, T2, T3, and T3. TLC particles can be illuminated using a monochromatic optical source, such as a laser (or LED, or SLED), with a wavelength $\lambda_S$. The detectors 62 and 64 can be positioned around the TLC particle at two angles $\theta_1$ and $\theta_2$ with $\theta_1 \neq \theta_2$. The detectors 62 and 64 can measure a power P1 and P2 from which a normalized difference signal x can be constructed:

$$x = \frac{P_2 - P_1}{P_2 + P_1} \quad (2)$$

At a low temperature all the light is scattered to $\alpha=0$ (full transmission) and the TLC is colorless. As the temperature increases, the Bragg condition is satisfied for some small $\vartheta$ and the laser is scattered into small angles. As the temperature continues to increase, eventually $\alpha=\theta_1$ and detector 1 measures a power maximum, then $\alpha=\theta_2$ and detector 2 measures a power maximum. At a certain temperature, the power on detector 1 (i.e., detector 64) and detector 2 (i.e., detector 62) is balanced and the sensitivity dx/dT to temperature changes is highest.

Figure 6A:
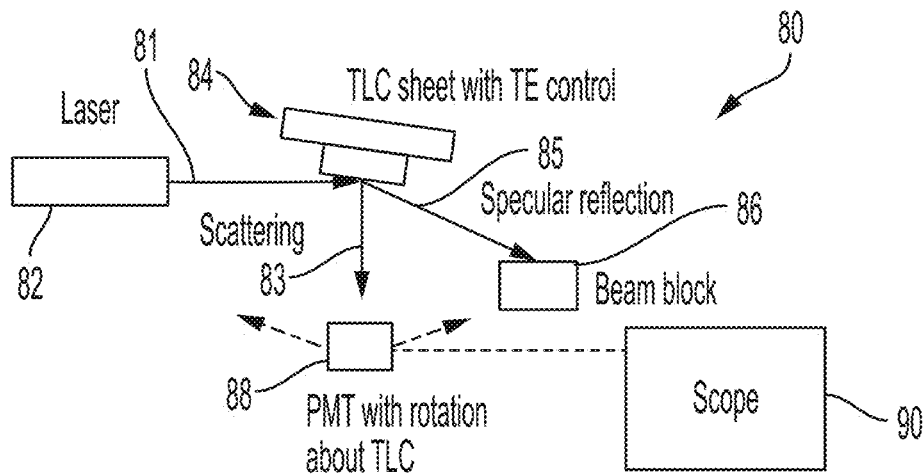
FIG. 6A illustrates a schematic diagram of a system for measuring the angular scattering profile of a TLC versus temperature and graphics depicting experimental data thereof, in accordance with an embodiment.

FIG. 6A illustrates a schematic diagram of a system 80 for measuring the angular scattering profile of a TLC versus temperature and graphics depicting experimental data thereof, in accordance with an embodiment. The system 80 can be used to measure the temperature of a sample, such as a TLC sheet 84 (with TE control). The TLC sheet 84 is thus a sample that contains thermochromic liquid crystal particle. The TLC sheet 84 is similar to the sheet 31 shown in FIG. 2A.

The system 80 can include one or more illumination sources such as a laser 82. Note that although a laser 82 is shown in the embodiment depicted in FIG. 6A, it can be appreciated that other types of illumination sources may be used in an embodiment of system 80. For example, a light-emitting diode or a super luminescent light-emitting diode may be utilize in place of the laser 82 as an illumination source.

The system 80 can also include a detector such as a PMT detector 88 (with rotation about the TLC). Note that although a PMT detector 88 is shown in FIG. 6A, it can be appreciated that in alternative embodiments of system 80, other types of detectors may be utilized, such as, for example, a detector (or detectors) based on a PIN photodiode, an avalanche photodiode, or an SiPM.

The system 80 can further include a beam block 86 and a scope 90. An illumination of light by the laser 82 with respect to the TLC sheet 84 is indicated by arrow 81 in FIG. 6A. Furthermore, specular reflection is indicated by arrow 86 in FIG. 6A and the scattering of light by arrow 83.

Figure 6B:
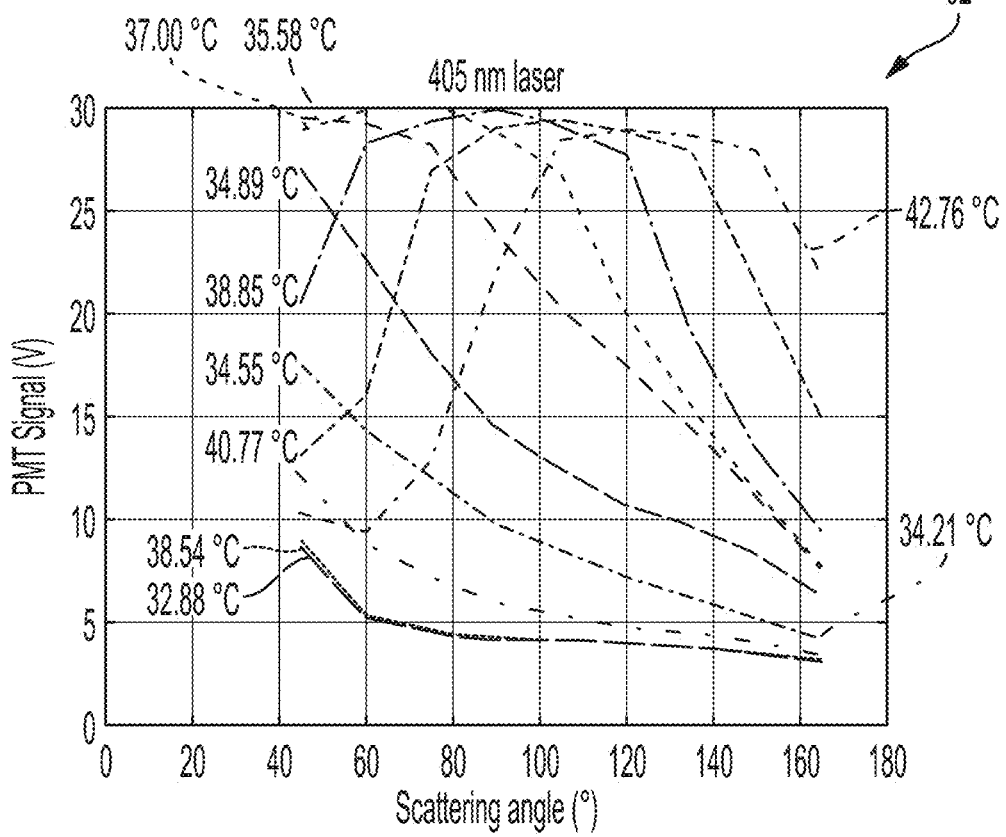
FIG. 6B illustrates a graph indicative of the scattering angle versus a PMT signal (V) for a 405 nm laser.
Figure 6C:
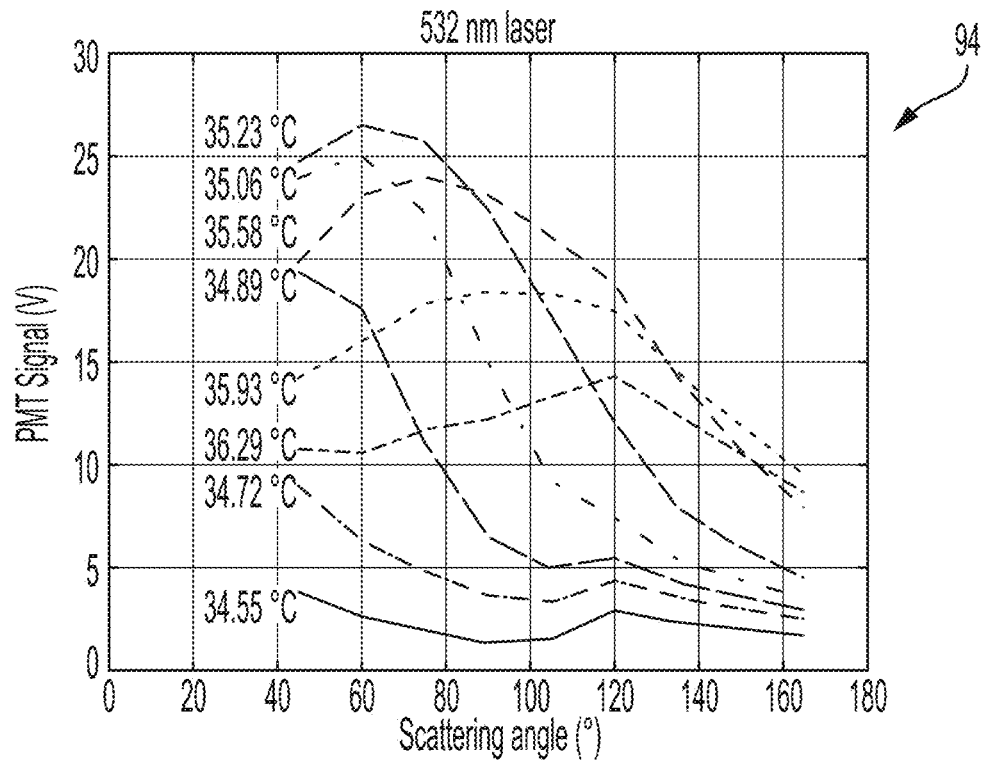
FIG. 6C illustrates a graph indicative of the scattering angle versus a PMT signal (V) for a 532 nm laser.

FIG. 6B illustrates a graph 92 indicative of the scattering angle versus a PMT signal (V) for a 405 nm laser. FIG. 6C, on the other hand, illustrates a graph 94 indicative of the scattering angle versus a PMT signal (V) for a 532 nm laser. That is, in some embodiments of system 80, the laser 82 can be implemented as a 405 nm laser. In other embodiments of system 80, the laser 82 may be implemented as a 532 nm laser. It can be appreciated that the use of these specific types of lasers is presented herein for illustrative and exemplary purposes only and should not be considered as limiting features of the embodiments.

Figure 6D:
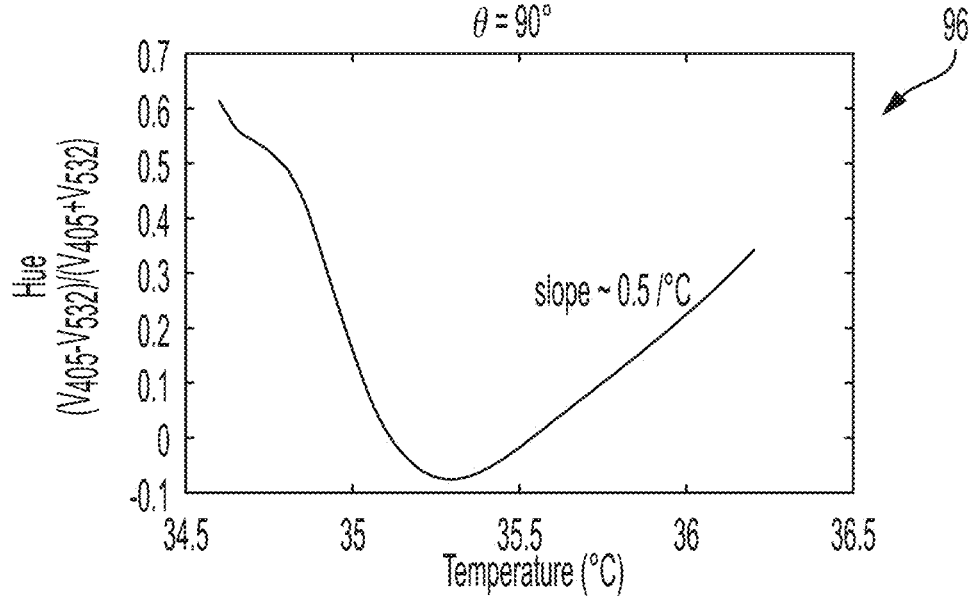
FIG. 6D illustrates a graph depicting the calculated sensitivity of normalized difference to a temperature shift for two wavelengths at 90°, in accordance with an embodiment.
Figure 6E:
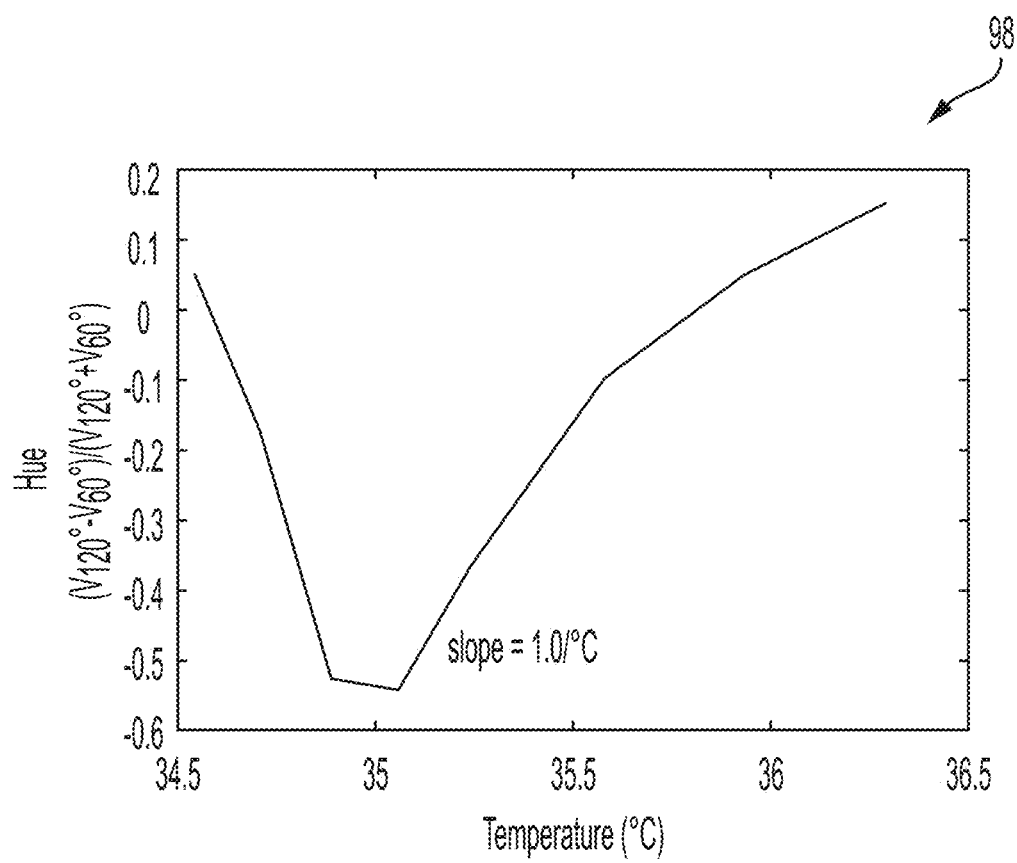
FIG. 6E illustrates a graph depicting the calculated sensitivity of normalized difference to a temperature shift for a single wavelength at 60° and 120°, in accordance with an embodiment.

FIG. 6D illustrates a graph 96 depicting the calculated sensitivity of normalized difference to a temperature shift for two wavelengths at 90°, in accordance with an embodiment. FIG. 6E illustrates a graph 98 depicting the calculated sensitivity of normalized difference to a temperature shift for a single wavelength at 60° and 120°, in accordance with an embodiment.

Using a single wavelength for the TLC temperature readout as shown in the embodiment of system 80 of FIG. 6A has several significant advantages over detecting a color shift. First, as proof of concept, experiments such as shown in FIG. 6B and FIG. 6C, demonstrate that the temperature sensitivity for the disclosed two-angle approach can be higher. Second, it may be easier to choose a single wavelength that can optimize overall system properties. For example, a wavelength could be chosen at the minimum of water absorption to minimize droplet heating by the illumination. The detectors and coatings can likewise be chosen optimally for the single wavelength (e.g., having a quantum efficiency, responsivity, or transmission), which is at a maximum at that wavelength.

Third, using two wavelengths may require achromatized optics, which can complicate the optical design and may introduce the possibility of noise from mismatched spatial illumination spots. Using a single wavelength can eliminate this noise source. Fourth, using only one laser can decrease the system cost and complexity owing to simpler illumination/detection optics and eliminating the need for broadband coatings. For example, a source intensity monitor may be eliminated because any source intensity fluctuations can be eliminated in computing the normalized difference from Equation 2. In summary, a single wavelength approach can offer a considerable number of advantages over two-wavelength detection for the SPOC readout.

Note that the system 80 depicted in FIG. 6A together with the graphs depicted in FIG. 6B to FIG. 6E demonstrate an experiment for measuring the angular scattering profile of a TLC as a function of temperature for two different illumination wavelengths: 405 nm and 532 nm. The TLC sample used was a sheet of encapsulated TLC microparticles embedded in a polymer matrix. The TLC sheet 84 was attached to a thermo-electric (TE) controlled copper block to adjust the temperature. A PMT detector such as the PMT detector 88 shown in FIG. 6A was mounted on a rotation stage with the axis of rotation coincident with the TLC sheet 84. The collected power was measured as a function of temperature and angle for both wavelengths.

FIG. 6B and FIG. 6C indicate the reflected light shifts from low scattering angles to high scattering angles as the temperature increases. FIG. 6D and FIG. 6E illustrate the normalized difference signal for two colors at 90o (FIG. 6D) compared to a single color at 60° and 120° (FIG. 6E). The maximum slope for the two-color signal is 0.5/° C., while the maximum slope for the single color signal is 1.0/° C. The conclusion is that in this case using a single color detected at two angles was more sensitive (higher slope) than using two colors at 90°.

FIG. 7A illustrates a system 140 for measuring the temperature of a sample 149, in accordance with an embodiment. The system 140 shown in FIG. 7A includes a first detector 141 and a second detector 142. An illumination source 147 is also included as a part of system 140, in addition to a sample 149. The system 140 also includes a first lens 143 and a second lens 145. The sample 149 is a TLC sample containing thermochromic liquid crystal particles. The detector 141 and the detector 142 are operable detect signals indicative of a component of illumination facilitated by the illumination source 148 and scattered at at least two angles θ1 and θ2 with respect to the sample 149 containing the thermochromic liquid crystal particles. The signals can be then converted to a temperature.

FIG. 7B illustrates a system 150 for measuring the temperature of a sample 156, in accordance with another embodiment. In the embodiment shown in FIG. 7B, the system uses a single detector 142, a first illumination source 157 and a second illumination source 159. A graph 158 of power is shown at the right of FIG. 7B.

The system 150 can include two illumination sources 157 and 159, and the sample 156 containing TLC particles. In addition, the detector 152 is operable to detect a signal (or signals) that are indicative of a component of an illumination facilitated by the illumination sources 157 and 159 and scattered at at least two angles $\theta 1$ and $\theta 2$ with respect to the TLC sample 156. The signal (or signals) is then converted to a temperature. The illumination sources 157 and 159 are monochromatic and may be implemented as or by illumination sources such as, for example, a laser, a light-emitting diode, or a super luminescent light-emitting diode.

In addition, the TLC sample 156 transparent with respect to illumination wavelengths associated with the illumination facilitated by the illumination sources 157 and 157 and scattered at the angles $\theta 1$ and $\theta 2$ with respect to the sample 156.

Using the angular scattering of monochrome illumination to detect a temperature change, illumination/detection at at least two different relative angles can be achieved. This can be accomplished using an embodiment involving one illumination beam and two detectors (FIG. 7A) or an embodiment that uses two illumination beams and one detector (FIG. 7b). In the latter case, the illumination may be switched between the two illumination beams at a rate that is fast compared to the residence time of a TLC in the detector field of view. The lenses L1 and L2 shown in FIG. 7A, for example, can collect light from a certain range of angles and concentrate it on detectors 1 and 2 (i.e., the first detector 141 and the second detector 142 show in FIG. 7A). An image may be formed on the detectors, but this may not be necessary.

FIG. 7C illustrates a system 160 for measuring the temperature of a sample, in accordance with an alternative embodiment. System 100 includes a positive-sensitive detector 162 that include a first detector 164 (D1) and a second detector 166 (D2) along with a lens 168 and an illumination source 169.

The embodiment shown in FIG. 7C uses the position-sensitive detector, wherein angular differences can be resolved by converting angular variations from the same emission point into spatial displacement by placing optical elements (e.g. the lens 168) into the light propagation path and placing the position-sensitive detector into the Fourier plane of the optical element.

FIG. 7D illustrates a system 170 for measuring the temperature of a sample, in accordance with yet another embodiment. The system 170 depicted in FIG. 7D can include a first detector 172, a second detector 174, an illumination source 178 and a TLC sample 176. In the embodiment shown in FIG. 7D, the angularly varying, propagating Bragg reflected light can spatially displace with increasing distance from its scattering source. Therefore, the Fourier optics can be omitted and a spatial position detection of Bragg scattered light in an appropriate distance from the scatter center may be used to determine the temperature dependent angular scattering characteristics.

The illumination or detection paths may be routed through free space as shown in FIG. 7A, FIG. 7B, FIG. 7C, and FIG. 7D using waveguides (e.g. fiber optics), or a combination of the two. While only one or two detectors are shown in FIG. 7A to FIG. 7D, the system(s) can be repeated into the plane of the page to measure a larger area of TLCs. The detectors in this case may be linear arrays or 2D arrays of detector elements. The illumination in this case may be either a static light sheet or a spot that moves over the sample. The scan must take place on a much shorter timescale than the residence time of a given TLC particle within the field of view. Another embodiment may involve an imaging configuration where the sample area can be large compared to the size of a TLC particle, the detectors in FIG. 7A to FIG. 7B are 2-d focal plane arrays (e.g. cameras), and the lenses can form an image of the TLC sample on the detectors.

Figure 8A:
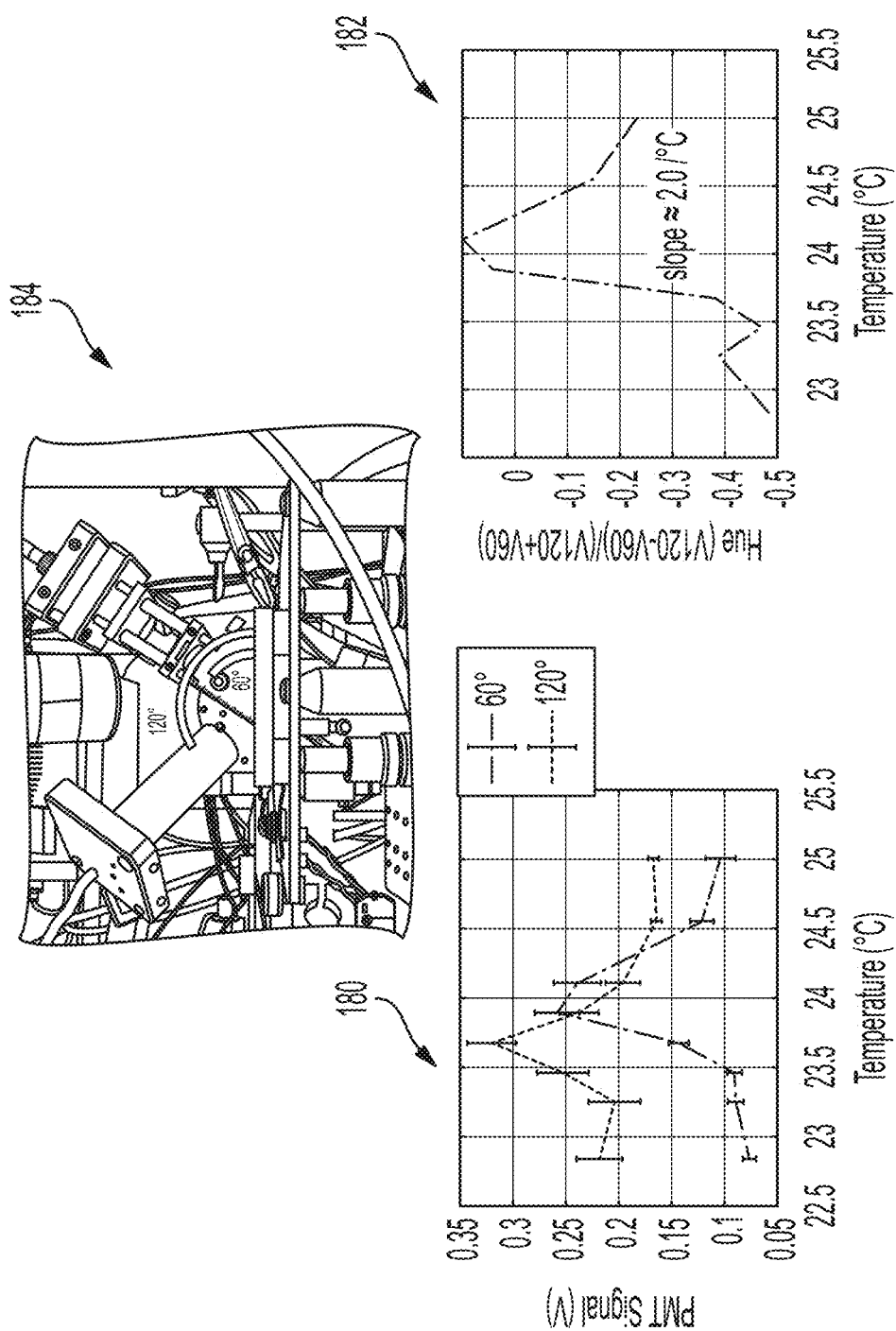
FIG. 8A illustrates graphs depicting the detection of droplet temperatures using single wavelength light collection at two different angles, in accordance with an embodiment.

FIG. 8A illustrates graphs 180 and 182 depicting the detection of droplet temperatures using single wavelength light collection at two different angles, in accordance with an embodiment. FIG. 8A also depicts a pictorial diagram of an example detector system 184, which may be utilized for the detection of droplet temperatures.

Figure 8B:
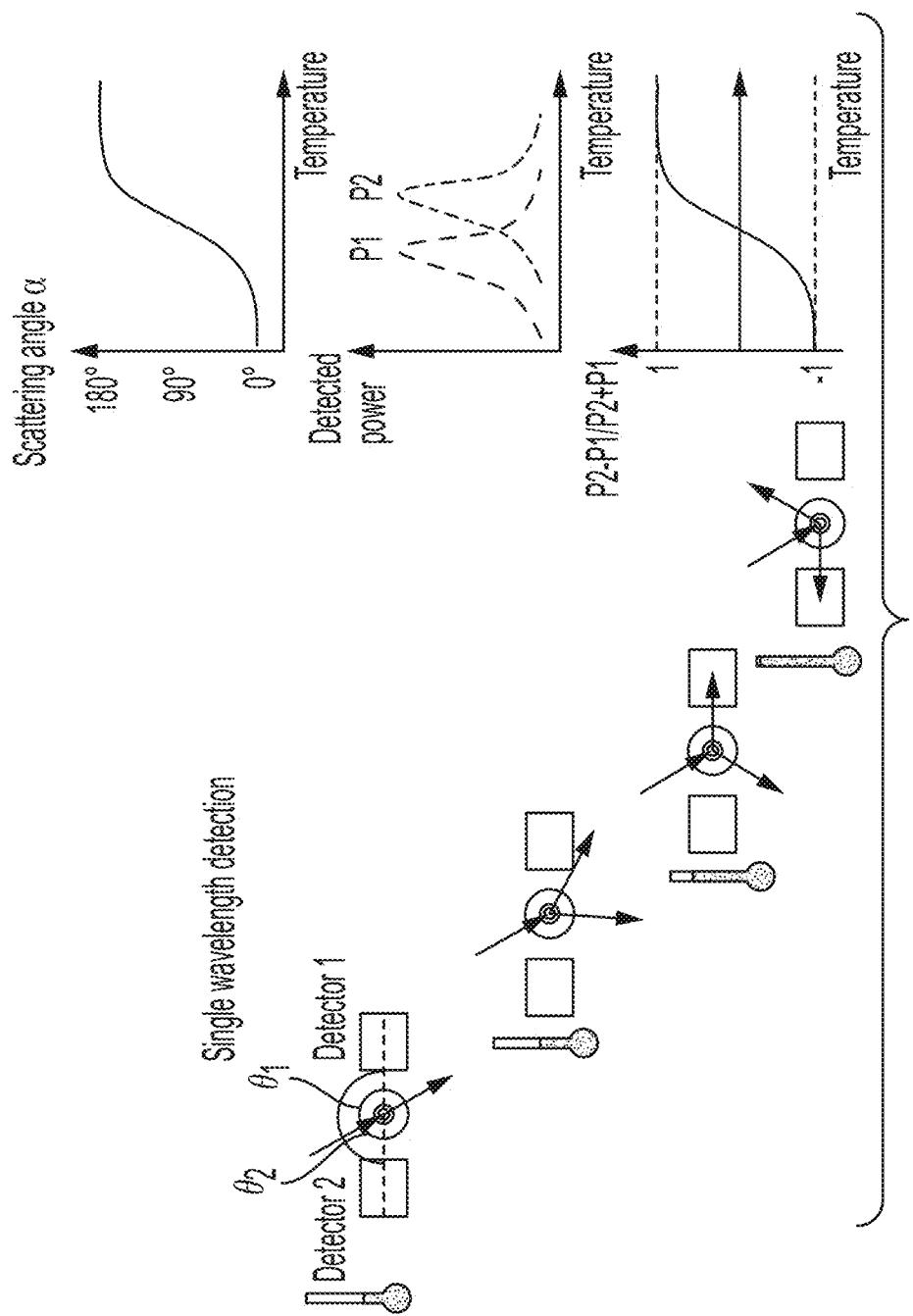
FIG. 8B illustrates a schematic diagram of the detector system shown in FIG. 8A, in the context of an experiment to measure reflectance of TLC in microfluidic droplets as a function of temperature and angle.

FIG. 8B illustrates a schematic diagram 60 of the detector system 184 shown in FIG. 8A, in the context of an experiment to measure reflectance of TLC in microfluidic droplets as a function of temperature and angle. Note that the schematic diagram 60 shown in FIG. 8B is similar to the schematic diagram 60 depicted in FIG. 5. Single wavelength light (e.g., at 532 nm) can be collected through optical fibers within the microfluidic channel at two different illumination angles (60° and 120°). This is the same optical configuration as shown in FIG. 6A but with aqueous suspended TLCs as the sample instead of a sheet.

Figure 9:
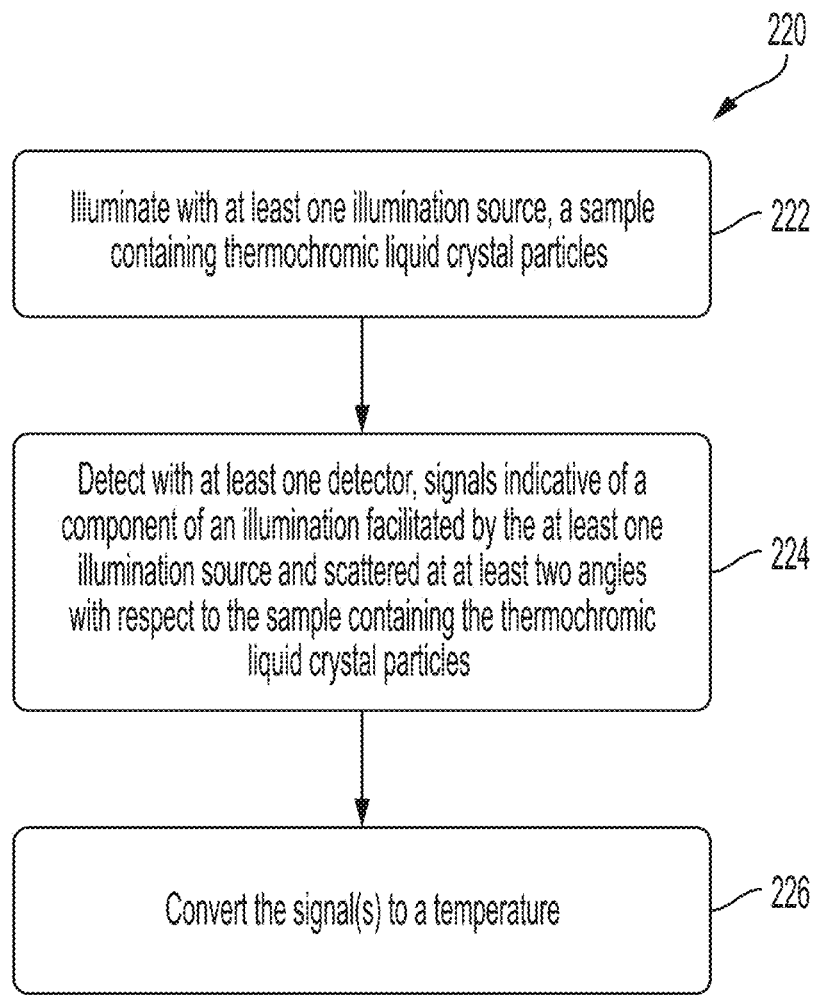
FIG. 9 illustrates a block diagram of a flow chart of operations depicting logical operational steps of a method for measuring the temperature of a sample, in accordance with an embodiment.

FIG. 9 illustrates a block diagram of a flow chart of operations depicting logical operational steps of a method 220 for measuring the temperature of a sample, in accordance with an embodiment. As shown at block 222, a step or operation can be implemented for illuminating with at least one illumination source, a sample containing thermochromic liquid crystal particles. Thereafter, as shown at block 224, a step or operation can be implemented for detecting with at least one detector, signals indicative of a component of an illumination facilitated by the at least one illumination source and scattered at at least two angles (e.g., at two or more angles) with respect to the sample containing the thermochromic liquid crystal particles. Next, as depicted at block 226, a step or operation can be implemented for converting the signals to a temperature.

Note that conversion of signals to a temperature, as indicated at block 226, can be facilitated or performed by a data analysis pipeline. Furthermore, the term 'data analysis pipeline' as utilized herein may refer to a set of actions that can ingest raw data from disparate sources and move the data to a destination for storage and analysis. A pipeline may also include filtering operations and features that can provide resiliency against failure. The data analysis pipeline may include operations such as signal processing, amplitude detection, low pass filtering and so on.

Figure 10:
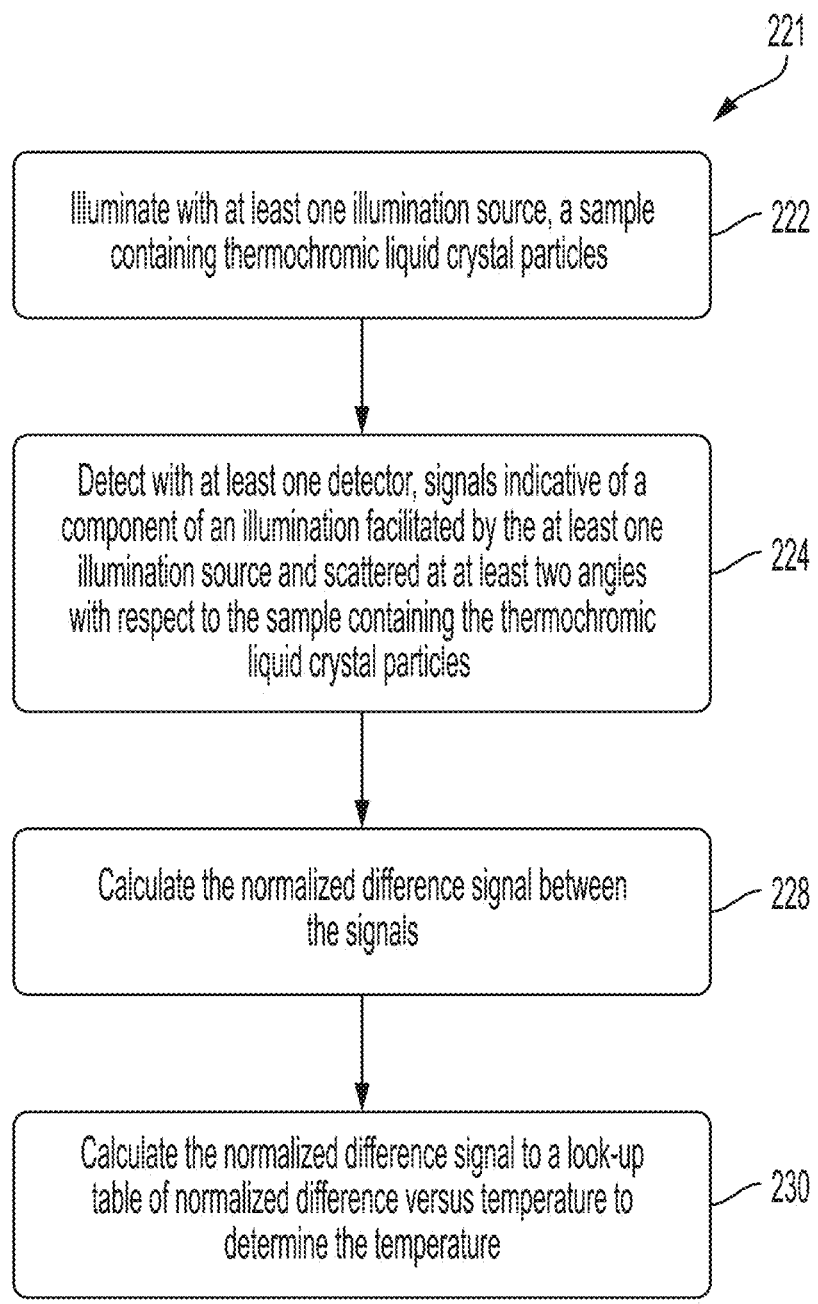
FIG. 10 depicts an alternative method for determining temperature including a calculation of the normalized difference signal between signals, in accordance with an embodiment.

FIG. 10 illustrates a block diagram of a flow chart of operations depicting logical operational steps of a method 221 for measuring the temperature of a sample, in accordance with another embodiment. Note that in FIG. 9 and FIG. 10 identical or similar parts are indicated by identical reference numerals. The step, operation or instructions shown at blocks 224 and block 224 in FIG. 9 are also depicted in FIG. 11.

FIG. 10 depicts an alternative approach for determining temperature. That is, as shown at block 228, a step or operation can be implemented for calculating the normalized difference signal between the signals (e.g., the signals including two or more signals). Thereafter, a step or operation can be implemented as shown at block 230 to compare the normalized difference signal to a look-up table of normalized difference versus temperature to determine the temperature. In some embodiments, the data analysis pipeline can be used to calculate the normalized difference signal between the signals and/or also used in comparing the normalized difference signal to the look-up table of normalized difference versus temperature to determine the temperature.

Although the operations of the method(s) and system(s) disclosed herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations and elements of the embodiments described herein may be implemented using software instructions stored on a computer useable storage medium for execution by a computer. As an example, an embodiment of a computer program product can include a computer useable storage medium to store a computer readable program.

The computer-useable or computer-readable storage medium can be an electronic, magnetic, optical, electromagnetic, infrared, or semiconductor system (or apparatus or device). Examples of non-transitory computer-useable and computer-readable storage media include a semiconductor or solid-state memory, magnetic tape, a removable computer diskette, a random access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

Alternatively, embodiments of the invention and elements thereof may be implemented entirely in hardware or in an implementation containing hardware and software elements. In embodiments that use software, the software may include but is not limited to firmware, resident software, microcode, etc.

Although specific embodiments of the invention have been described and illustrated, the invention is not to be limited to the specific forms or arrangements of parts so described and illustrated. The scope of the invention is to be defined by the claims appended hereto and their equivalents.

It will be appreciated that variations of the above-disclosed and other features and functions, or alternatives thereof, may be desirably combined into many other different systems or applications. It will also be appreciated that various presently unforeseen or unanticipated alternatives, modifications, variations, or improvements therein may be subsequently made by those skilled in the art which are also intended to be encompassed by the following claims.

What is claimed is:

1. A system for measuring the temperature of a sample, comprising:
   at least one illumination source;
   a sample containing thermochromic material comprising thermochromic liquid crystal (TLC) particles; and
   at least one detector operable to detect at least two signals indicative of a component of an illumination facilitated by the at least one illumination source and scattered at at least two angles with respect to the sample containing the thermochromic material, wherein the at least two signals are converted to a temperature that is used to detect a temperature shift in the TLC particles using a single wavelength and the at least two angles and wherein the single wavelength is selected for optimization of the properties of the system for measuring the temperature of the sample.

2. The system of claim 1 wherein the at least one illumination source is substantially monochromatic.

3. The system of claim 1 wherein:
   the thermochromic material is in thermal contact with the sample; and
   the temperature of the thermochromic material substantially represents the temperature of the sample.

4. The system of claim 1 wherein the at least one illumination source comprises at least one of: a laser, a light-emitting diode, a super luminescent light-emitting diode, or a broadband light source in combination with an optical filter.

5. The system of claim 1 wherein the at least one detector contains at least one of: a lens or a waveguide that collects scattered light.

6. The system of claim 1 further comprising a data analysis pipeline that calculates a temperature from the at least two signals.

7. The system of claim 6 wherein the data analysis pipeline is used to calculate a normalized difference signal between of the at least two signals and for comparing the normalized difference signal to a look-up table of normalized difference versus temperature to determine the temperature from the at least two signals.

8. The system of claim 1 wherein the at least one detector comprises at least one of: a PIN photodiode, an avalanche photodiode, a silicon photomultiplier (SiPM), or a photomultiplier tube (PMT).

9. The system of claim 1 wherein the sample comprises a microfluidic droplet, wherein the wavelength is selected a minimum of water absorption to minimize a heating of the microfluidic droplet by the illumination.

10. The system of claim 1 wherein the sample comprises a single-phase fluid.

11. A method for measuring the temperature of a sample, comprising:
    illuminating with at least one illumination source, a sample containing thermochromic material comprising thermochromic liquid crystal (TLC) particles;
    detecting with at least one detector, at least two signals indicative of a component of an illumination facilitated by the at least one illumination source and scattered at at least two angles with respect to the sample containing the thermochromic material; and
    converting the at least two signals to a temperature; and
    using the temperature converted from the at least two signals to detect a temperature shift in the TLC particles using a single wavelength and the at least two angles and wherein the single wavelength is selected for optimization properties of a system for implementing the method for measuring the temperature of the sample.

12. The method of claim 11 wherein:
    the at least one illumination source is substantially monochromatic; and
    the at least one illumination source comprises at least one of: a laser, a light-emitting diode, a super luminescent light-emitting diode, or a broadband light source in combination with an optical filter.

13. The method of claim 11 wherein the sample is transparent with respect to illumination wavelengths associated with the illumination facilitated by the at least one illumination source.

14. The method of claim 11 wherein the at least one detector contains at least one of: a lens or a waveguide that collects reflected light.

15. The method of claim 11 further comprising: providing a data analysis pipeline that calculates a temperature from the at least two signals.

16. The method of claim 11 wherein the at least one detector comprises at least one of: a PIN photodiode, an avalanche photodiode, a silicon photomultiplier (SiPM), or a photomultiplier tube (PMT).

17. The method of claim 11 wherein the sample comprises:
a microfluidic droplet comprising a single-phase fluid, wherein the microfluid droplet is contained in a microwell.

18. A computer-program product for measuring the temperature of a sample, the computer-program product comprising a non-transitory tangible computer-readable medium having computer-readable instructions thereon, the computer-readable instructions being executable by a processor to cause the processor to perform:
illuminating with at least one illumination source, a sample containing thermochromic material comprising thermochromic liquid crystal (TLC) particles;
detecting with at least one detector, at least two signals indicative of a component of an illumination facilitated by the at least one illumination source and scattered at at least two angles with respect to the sample containing the thermochromic material; and
converting the at least two signals to a temperature;
using the temperature converted from the at least two signals to detect a temperature shift in the TLC particles using a single wavelength and the at least two angles, wherein the single wavelength is selected for optimization of the properties of the system for measuring the temperature of the sample.

19. The computer-program product of claim 18, wherein the computer-readable instructions are further executable by the processor to cause the processor to perform:
using a data analysis pipeline to calculate a normalized difference signal between the at least two signals and for comparing the normalized difference signal to a look-up table of normalized difference versus temperature to determine the temperature from the at least two signals.

20. The computer-program product of claim 18, wherein the computer-readable instructions are further executable by the processor to cause the processor to perform:
computing the temperature based on a normalized difference signal and a look-up table of normalized difference versus temperature.

* * * * *